C. N. TYLER.
PROCESS OF GENERATING ILLUMINATING GAS.
No. 24,506. Patented June 21, 1859.
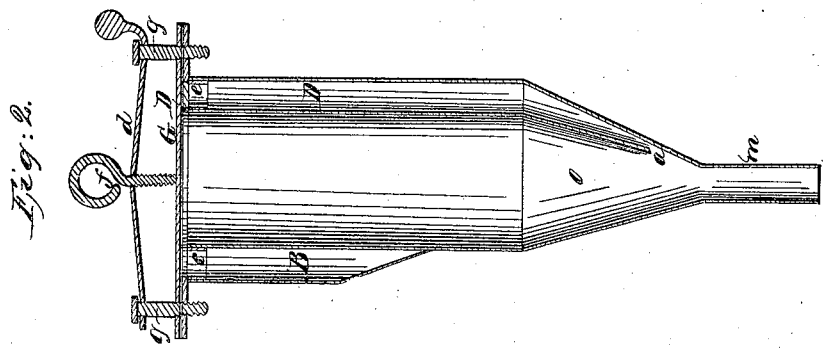
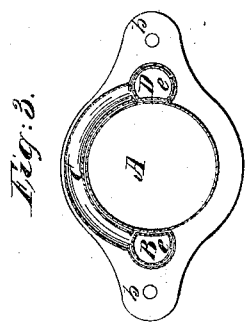
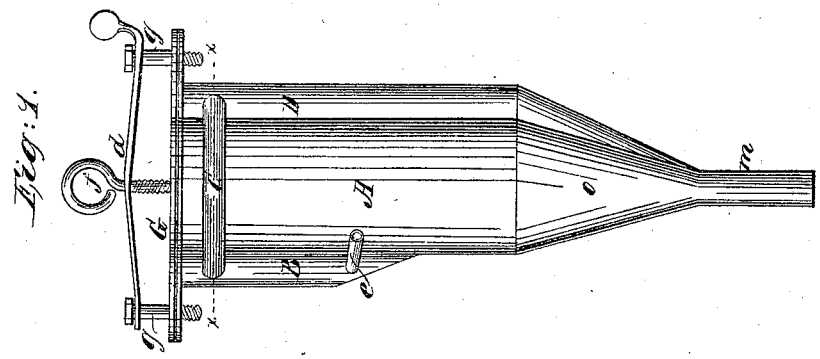
Witnesses:
D. Hannay
W. M. Bryant

UNITED STATES PATENT OFFICE.

CHAS. N. TYLER, OF WASHINGTON, DISTRICT OF COLUMBIA.

MANUFACTURE OF GAS.

Specification of Letters Patent No. 24,506, dated June 21, 1859.

*To all whom it may concern:*

Be it known that I, CHARLES N. TYLER, of the city of Washington, in the District of Columbia, have invented a certain new and useful improvement in generating illuminating-gas from coal, oil, rosin, tar, bitumen, and other carboniferous materials suitable for the purpose, of which the following is a full, clear, and exact description, reference being had to the accompanying drawing of an apparatus suitable for carrying my improvement into effect, in which—

Figure 1 represents a plan of the apparatus, Fig. 2 a horizontal section and Fig. 3 a vertical transverse section of the same taken through the line *x x* of Fig. 1.

My improvement relates more especially to the mode of combining hydrogen gas with the gaseous products evolved from the dry distillation of coal, oil, rosin, and other such substances. And it consists in combining them, while these products are in their nascent state, under the influence of a very high degree of heat; whereby their union is more readily and permanently effected, and the formation of tar and other such products prevented by the permanent suspension and union of the redundant carbon with the hydrogen gas thus added. So that from a given quantity of gas generating materials, more illuminating gas will be produced, and of superior quality and purity than by other known methods.

To enable others skilled in the art to use my invention I will now proceed to describe it in detail, in connection with an apparatus suitable for carrying my improvement into effect.

The coal or other substances from which the illuminating gas is to be generated, is placed in the main retort (*a*), Fig. 1, and the water from which the hydrogen gas is to be formed in the boiler (*b*); which as heat is applied, is generated into steam, and passes over by means of the pipe (*c*), into a supplementary retort (*d*), filled with scrap or small pieces of bar iron, heated as in the case of the main retort (*a*) to a dull or cherry red heat, which deoxidizes the steam, and sets free the hydrogen, which then passes out along with such steam as may be undeoxidized at the rear end of the retort into the main retort (A), and mixes with the gaseous products therein contained, evolved from the coal or other material where the two thus combined are subjected to the action of a high degree of heat, previous to their exit from the main retort; for which purpose their escape is retarded by the contraction and elongation of the rear end of the main retort, and that while under the direct action of the fire thereby insuring by the law of gases their perfect union and transformation into permanent illuminating gas (carbureted hydrogen). The gas thus formed may if deemed advisable be subjected to the usual processes for the purposes of purification, &c., common to other illuminating gases in order to deprive it of such sulfureted hydrogen, &c., as may be formed during the process where coal has been used, and for the abstraction and condensation of such carbonaceous particles as may not have been transformed into permanent gas, in the shape of tar and other kindred products. But as a rule very little if any of the latter will be formed where proper care has been taken in conducting the process, and in regulating the quantity of hydrogen gas formed, and mixed with the gaseous products evolved from the distillation of the carboniferous materials. For which purpose it will be apparent that a larger amount of hydrogen gas must be used where the material is rich in redundant carbon, than where it is less rich. By this process also it will be apparent that inasmuch as the object of the invention is to utilize all the redundant carbon of the carboniferous material being distilled by its permanent union in the shape of gas with hydrogen gas, that a much larger quantity of illuminating gas, of a better quality for the purposes of burning, must necessarily be formed, than where the redundant carbon is allowed to be wasted in the shape of tar, &c.—articles of little value, and where large portions of it is allowed to escape in burning unconsumed, in the form of smoke.

Here it may be remarked that various modifications of an apparatus proper for carrying my invention into effect might be described; but as such changes in the apparatus would produce only a variation of the same process, and not affect the principle of the invention, it is not deemed necessary here further to pursue them. And again the steam itself may be substituted by other articles for the production of hydrogen gas, and for which purpose other apparatus, &c., may be necessary; but as such change would still result in the production and use of hydrogen gas for the same purpose it will be apparent that it would still be the same invention and no alteration of its principle.

Having thus described my invention what I claim as new and desire to secure by Letters Patent is—

Combining hydrogen gas with the volatile and easily condensible products of coal, rosin, tar, &c., in their nascent state in the manner and for the purposes substantially as herein set forth.

In testimony whereof, I hereunto set my hand to this specification.

C. N. TYLER.

Witnesses:
P. HANNAY,
W. M. BRYANT.